(12) United States Patent
Strubbe

(10) Patent No.: US 6,724,368 B2
(45) Date of Patent: Apr. 20, 2004

(54) REMOTE CONTROL SYSTEM AND METHOD FOR A TELEVISION RECEIVER

(75) Inventor: Hugo J Strubbe, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 224 days.

(21) Appl. No.: 10/017,204

(22) Filed: Dec. 14, 2001

(65) Prior Publication Data

US 2003/0128187 A1 Jul. 10, 2003

(51) Int. Cl.[7] .............................. G09G 5/08; G08C 19/00
(52) U.S. Cl. ....................... 345/158; 348/734; 345/169; 345/156
(58) Field of Search ................................ 345/156–169; 348/734, 211.4; 463/37–38; 273/148 B

(56) References Cited

U.S. PATENT DOCUMENTS

| | | | | |
|---|---|---|---|---|
| 5,444,462 A | * | 8/1995 | Wambach | 345/158 |
| 5,444,499 A | * | 8/1995 | Saitoh | 348/734 |
| 5,554,980 A | * | 9/1996 | Hashimoto et al. | 345/158 |
| 5,712,658 A | * | 1/1998 | Arita et al. | 345/158 |
| 5,926,168 A | * | 7/1999 | Fan | 345/158 |
| 6,271,831 B1 | * | 8/2001 | Escobosa et al. | 345/158 |

FOREIGN PATENT DOCUMENTS

WO WO0120441 9/2000 ............ G06F/3/033

OTHER PUBLICATIONS

A. Colmenarez et al., "Computer Vision–Based, Wireless Pointing System", Ser. No. 09/746,045, filed Dec. 22, 2000, Attorney Docket No. US000403.

* cited by examiner

*Primary Examiner*—Lun-Yi Lao

(57) ABSTRACT

A system and method for controlling the movement of a cursor on a monitor screen are provided. The system comprising at least one remote control unit having a plurality of push buttons for remotely controlling the moving direction of the cursor on the monitor screen; at least one light emitting element for emitting light that indicates a signal generated by the remote control unit; a light detector for extracting the light movement that is transmitted sequentially from the remote control unit; and, a control unit for displaying the moving position of the cursor on the monitor screen corresponding to the extracted movement of the light from the remote control unit, and also adapted to stop the moving position of the cursor upon releasing the push button of the remote control unit. The movement of the cursor on the monitor screen also can be stopped if the light movement transmitted from the remote control unit changes in the opposite direction.

26 Claims, 3 Drawing Sheets

REMOTE CONTROL SYSTEM AND METHOD FOR A TELEVISION RECEIVER

BACKGROUND OF THE INVENTION

1. Field of the Invention

The present invention relates to a remote hand-held device to be used as a pointing cursor on a display, and more particularly, to a remote control system and method for controlling the movement of a cursor on the display.

2. Description of the Related Art

With the advent of the Internet technologies, it is foreseeable that the function of computers will be integrated with the television, set-top boxes, or the like. As such, viewers watching television at a certain distance may be able to interact with the television monitor through moving a cursor on the TV screen for screen manipulation. To this end, a touch screen has been proposed to allow a user to select the menus on the TV screen. However, the user must get close to the screen and make a personal contact with the screen, which is inconvenient for the user. Alternatively, viewers may manipulate the upward, downward, left, and right buttons provided in a remote control unit to select different menus on the TV screen. However, these techniques do not provide a functional capability that is the same as a mouse and easy to use in conventional computing environments.

Although there have been many attempts to provide the equivalent function of a mouse using a remote control unit, the ability to point and stop at a precise location has been a difficult task. In the conventional computer and mouse setting, the ability to move and stop the cursor on a screen is achieved easily as the mouse is movably displaced on a mouse pad in a substantially horizontal orientation. The "gravity effect" of pulling the mouse in a downward vertical direction is eliminated by the mouse pad that is displaced in a stationary position. Thus, the user simply needs to release the mouse, or hold the mouse in a stationary position against the mouse pad. However, the "gravity effect" on a hand-held device, i.e., a remote control, makes the hand-held device difficult to use, especially for those with unstable hands, to be in a stationary position when pointing it at a monitor screen. Therefore, there is a need for a selection device with the same capability of a mouse to move and select a displayed option for action by moving a cursor on the displayed screen from a remote distance.

SUMMARY OF THE INVENTION

The present invention relates to a remote control system and method to enable a user to move a cursor on a screen in response to the wrist motions that a user makes using a remote control unit having a light-emitting source.

According to one aspect of the invention, a system for controlling the movement of a cursor on a monitor screen is provided. The system includes at least one remote control unit for remotely controlling the cursor movement on the monitor screen; at least one light emitting element for emitting light indicative of a signal generated by the remote control unit in response to a first click operation; a light detector for extracting the light movement transmitted from the remote control unit; and, a control unit adapted to display the moving position of the cursor on the monitor screen corresponding to the extracted movement of the light from the remote control unit, and adapted to stop the moving position of the cursor on the monitor screen in response to the release of the first click operation. The moving position of the cursor also may be stopped if the light movement of the remote control unit changes in the opposite direction. The control unit comprises an image detection algorithm that detects the image of the light transmitted from the remote control unit. The light detector may include two digital cameras for detecting the position of the remote control unit in three dimensions. Similarly, the remote control unit may include two light elements for detecting the rotation position of the remote control unit in three dimensions.

According to another aspect of the present invention, a system for controlling the movement of a cursor on a monitor screen is provided. The system includes two or more remote control units, each having at least one light emitting element adapted to transmit light at different frequencies or patterns of flashing; at least one light detector for detecting the light movement transmitted from each light emitting element of the remote control units; and, a control unit for displaying the cursor on the monitor screen through a first click operation of the remote control unit and for translating the movement of the cursor based on the detected light movement from the remote control unit, wherein the motion of the cursor is halted in response to the release of the first click operation of the remote control unit. The movement of the cursor also may be stopped if the movement of the light transmitted from the remote control unit changes in the opposite direction. The light detector communicates with the control unit to deliver a sequence of digital images that include the light emitted from the remote control units.

According to a further aspect of the invention, a method for controlling the movement of a cursor on a monitor screen through a remote control unit with at least one light emitting element is provided. The method includes the steps of: pointing the light emitting element of the remote control unit toward a camera; transmitting a first light signal indicating the start of the cursor through a first click operation; detecting the light movement generated in response to the first click operation in at least two dimensions; moving the cursor on the monitor screen corresponding to the detected movement of light from the remote control unit; and, stopping the movement of the cursor on the monitor screen in response to the release of the first click operation.

The foregoing and other features and advantages of the invention will be apparent from the following, more detailed description of preferred embodiments as illustrated in the accompanying drawings in which reference characters refer to the same parts throughout the various views. The drawings are not necessarily to scale, the emphasis is placed instead upon illustrating the principles of the invention.

DETAILED DESCRIPTION OF THE DRAWINGS

A more complete understanding of the method and apparatus of the present invention is available by reference to the following detailed description when taken in conjunction with the accompanying drawings wherein.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
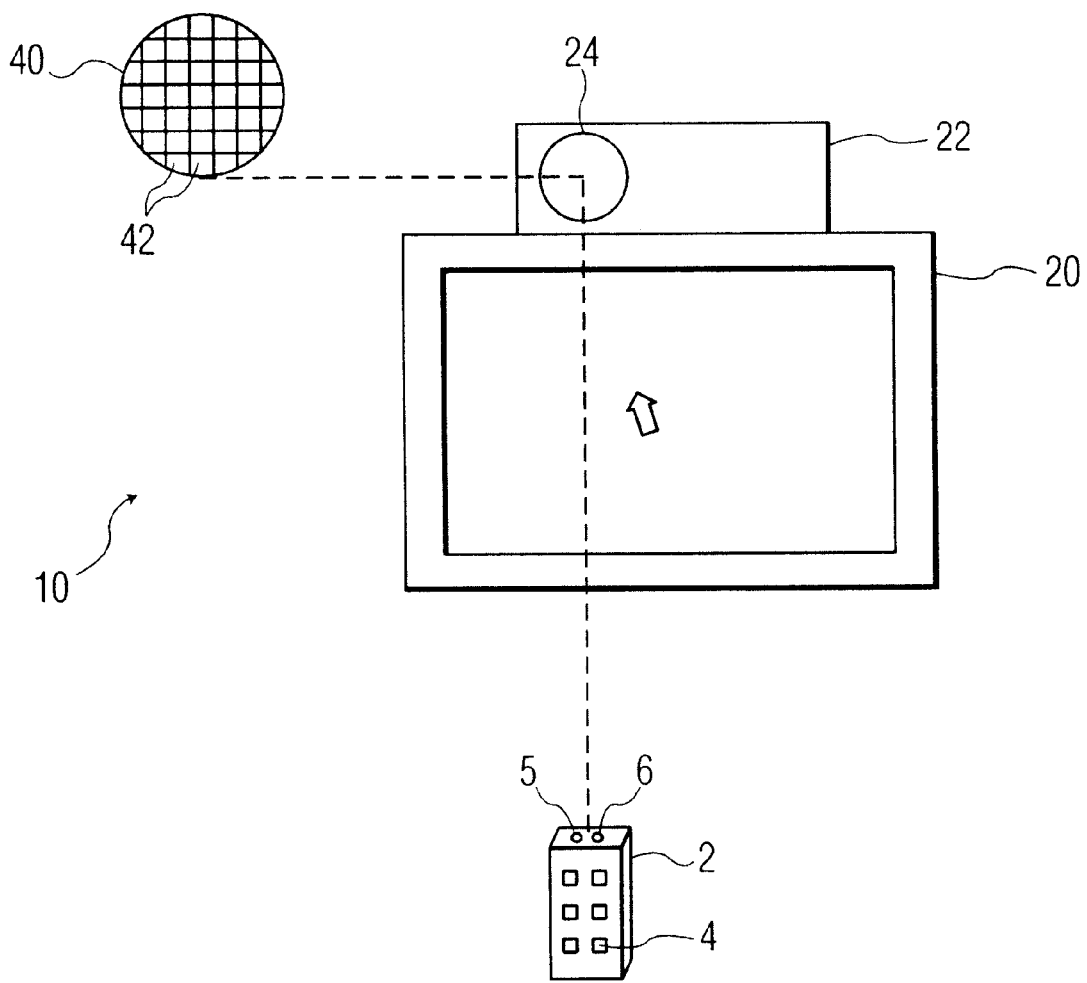
FIG. 1 is a simplified block diagram illustrating the remote control system whereto embodiments of the present invention are to be applied.

FIG. 1 is a simplified block diagram illustrating the architecture of a remote control system 10 whereto the embodiments of the present invention are to be applied. The remote control system 10 includes a remote control unit 2 having a plurality of control buttons 4, an infra red (IR) LED 5, and an LED 6; a television (TV) set 20; a control system 22; and, a digital camera 24.

The front face of the remote control unit 2 may contain an ON/OFF button for activating or terminating the power of the TV set 20 and a number of buttons for selecting a channel. It should be noted that the remote control unit 2 may further include other buttons, for example, "power," "volume up," "volume down," "channel up," "channel down," "identification select," "menu up," "menu down," "menu select," or other features depending on the particular application. In operation, the user activates one of the control buttons 4 to cause the LED 6 to flash at a predetermined frequency toward the TV set 20. At the same time, an IR signal via the LED 5 is transmitted from the remote control unit 2 to the TV set 20 to activate/deactivate the cursor mode. Here, the transmission medium is not restricted to the infrared ray but it is permissible to use a visible ray, ultraviolet ray, supersonic wave, electronic wave or the like. The activation of the flashing can be achieved by any switching method, for example, an on/off switch, a motion switch, or a device that is sensitive to user contact so that the LED 6 can be turned on when the user touches or picks up the device.

The TV set 20 is adapted to receive a stream of video signals from a variety of sources, including a cable service provider, a digital high definition television (HDTV) and/or digital standard definition television (SDTV) signals, a satellite dish, a conventional RF broadcast, an Internet connection, or other storage devices such as a VHS player or DVD player. Although the television (TV) set 20 is shown for illustrative purposes, it should be noted that other display devices, i.e, a computer monitor and a projection screen that is capable of projecting video images, may be used. In addition, the remote control system 10 may include a much larger number of remote control units with different preset frequencies to be used as a point device for screen manipulation.

The digital camera 24 in accordance with the techniques of the present invention may include any commercially available camera or other systems that are capable of tracking the visual light emitted from the remote control unit 2. The camera 24 may have a coating on the lens to block the IR signal from the LED 5 or may include a filter to block the IR signal received therein. Typically, digital cameras use a 2D light-sensitive array 40 that captures light that is incident on the surface of the array after passing through the focusing optics of the camera. The array 40 comprises a grid of light sensitive cells 42, i.e., a CCD array. Each cell 42 is electrically connected to other electronic elements, including an A/D converter, buffer and other memory, a processor and compression modules.

In the embodiment, the light transmitted from the remote control unit 2 is incident on the array surface made of cells. Each image of the digital camera 24 is typically captured when a shutter (not shown) allows light (i.e., light from LED 6) to be incident and recorded by a light-sensitive surface. A "shutter" can be any equivalent light-regulating mechanism or electronics that generate successive images on a digital camera, or successive image frames on a digital video recorder. Light that comprises the image enters the camera 24 when the shutter is open and focused by the camera optics into a corresponding region of the array surface. Each light sensitive cell (or pixel) records the intensity of the light that is incident thereon. Thus, flashing light transmitted from the remote control unit 2 that enters the camera 24 is focused approximately to a point and recorded as an incident intensity level by one or a small group of pixels. The digital camera 24 processes and transmits the light level recorded in each pixel in digitized form to a control unit 22. Although the digital camera 24 is integrated as a single unit with the control system 22, it should be noted that the camera 24 may be configured as an independent unit and perform the same function in accordance with the techniques of the present invention.

The control system 22 operates to track and capture the movement of the light emitted from the remote control unit 2 via the LED 6. To this end, the control unit 22 includes image recognition algorithms that detect and track light from the LED 6. Where light from the LED is flashing at a frequency from the remote control unit 2, successive images of the light spot from the LED 6 are captured. Once a pattern is recognized, the algorithm includes the position of the image corresponding to the location of the remote control unit 2. Alternatively, the control unit 22 may look for the features of the remote control unit 2 in the image pixel data, such as a light spot surrounded by a darker immediate background, in order to capture and track the movement of the light. After determining the location of the remote control unit by the control unit 22, the location can be tracked for successive images by the control unit 22 using a known image-tracking algorithm. Then, the control unit 22 focuses the region of the image that corresponds to the location of the remote control unit 2 in the preceding image or images. It should be noted that the control unit 22 may include a set top box, such as ReplayTV (trademark of REPLAY NETWORKS, INC., of Palo Alto, Calif.) and TiVo (trademark of TIVO, Inc., of Sunnyvale, Calif.), a VHS player, DVD player, and other personal recording devices that gives the television viewer new abilities to capture and manipulate the stream of television shows, which flow from their cable and satellite systems. In addition, the control system 22 may be integrated as a single unit with the TV set 20 in accordance with the techniques of the present invention.

Moving a cursor on a screen using a remote control-like device in accordance with the preferred embodiment can be performed as disclosed in U.S. application Ser. No.: 09/746,045, filed on Dec. 22, 2000, assigned to the same assignee, and herein incorporated by simple reference. The present invention is a further improvement of the embodiments discussed in the above reference.

The remote control system described in the above-cited U.S. patent application Ser. No. 09/746,045 has a drawback in that the system requires a large hand motion to guide the cursor on the screen. That is, the cursor movement proportional to the displacement of a light spot in the field of view of the camera 24 requires too large a hand motion to be practical. Due to the large hand motion requirement, the displacement leads to a very coarse grid, and can never be pixel-accurate. To address this problem, the present invention enables the users to use a minor twist motion in their wrists, while allowing every individual pixel on the screen to be reached by such wrist motion.

Now, a brief description of the various embodiments disclosed in the above reference will be described hereinafter with reference to the drawings.

Referring back to FIG. 1, the position of the remote control unit 2 and in particular the light emitted by the LED 6 is identified and tracked by the control unit 22, then mapped onto the screen of the TV set 20. The position of the cursor on the display may be correlated to the position of the remote control unit 2 in the image as follows:

$$Xdpy = scale*(Ximg - Xref),$$

wherein Vector Xdpy represents the displacement of the cursor in a 2D reference coordinate system of the display, Vector Ximg represents the position of the remote control unit 2 as identified by the control unit in the 2D image, Vector Xref represents a reference point in the image space, and "scale" represents a salar scaling factor used by the control unit 22 to scale the image space to the display space. Hence, the position of the remote control unit 2 in the image space when moved is determined with respect to a constant reference point. Thus, the mapping of the remote control unit 2 as detected in the image space only changes when there is a movement of the remote control unit 2 with respect to the reference point. The reference point may be detected every time the flashing light is detected and reset when the light disappears, corresponding to when the user disengages and then re-engages the remote control unit 2.

According to the principle of the present invention, the movement of the remote control unit 2 in response to the wrist motion by the user allows the controller 22 to capture the light emitted by the remote control unit 2 via the LED 6. The movement of the light from the remote control unit 2 or other remote control is captured by the camera 24 and incident on a portion of the light sensing surface of the camera 24. At the same time, an IR signal generated from the remote control unit 2 via LED 5 is received by the system to switch the cursor mode on/off. In an alternative embodiment, a single LED 5 capable of transmitting bursts of light that are modulated such as to contain additional digital information may be used to translate the movement of the remote control unit 2 in response to the wrist motion and to set the cursor mode on/off.

In the embodiment, the displacement of light captured by the camera is used as a direction in which the cursor should travel along the screen space. For example, if the light emitted via the LED 6 from the remote control unit 2 is moved along a particular direction, the cursor continues to move along that direction at a varying speed until a stop mode is activated. Initially, a cursor spot is activated by pressing a button 4 in the remote control unit 2. The IR signal transmitted from the remote control unit 2 via the LED 5 serves as an activation signal to display the cursor on the screen. At the same time, the light having a preset frequency is projected out of the remote control unit 2, then captured by the camera 24. If the activated button is released by the user, the release of the button 4 is immediately noticed by the IR receiver of the control system 22 which then stops the motion of the cursor. As such, the camera 24 is equipped with a filter or a coating material on the lens to block the IR signal for the purpose of differentiating two different light signals—one from the LED 5 and the other from the LED 6. Alternatively, any return of the wrist motion that is in the opposite direction of the traveling cursor can stop the cursor during motion. That is, if the user changes the direction of the wrist in the opposite direction while the cursor is moving along a particular direction, the system 10 will recognize this as an indication to stop the cursor movement.

After the cursor is paused as described in the preceding paragraph, a further movement of the wrist with relation to the paused point restarts the starting point for the cursor. Meanwhile, if the button 4 is, for example, further compressed (which then changes the IR code sent by the IR LED 5), then the "mouse clicking" at the desired location is activated. This change of code leads to the clicking action, making the cursor motion relatively stable, in spite of wobbly wrist motions of the user.

Figure 2:
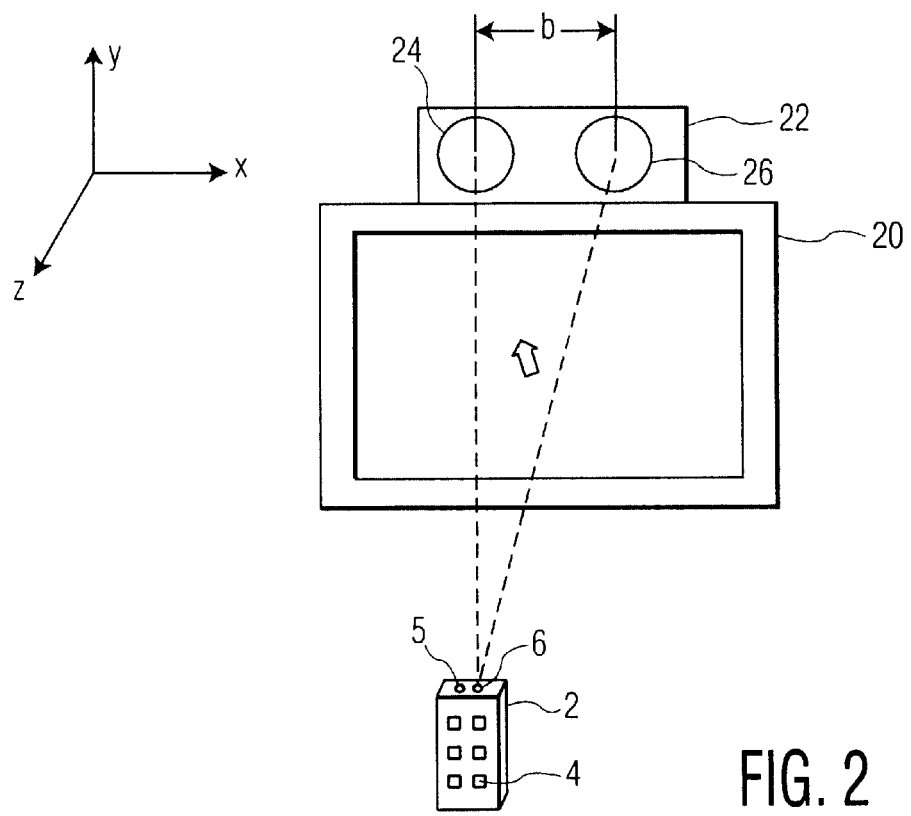
FIG. 2 is a representative view of the remote control system according to another embodiment of the present invention.

FIG. 2 illustrates another system whereto the embodiment of the present invention may be applied. The construction and operation of the system shown in FIG. 2 are essentially the same as that described above with respect to FIG. 1 and the above-cited U.S. patent application Ser. No. 09/746,045, except at least one additional digital camera 26 is provided to move selectively and halt the cursor on the screen in response to a user's request. Hence, the discussion of similar components described in the preceding paragraphs is omitted to avoid redundancy, as they are described with respect to FIG. 1. The addition of at least one camera enables the system to detect and quantify a depth movement in the Z direction using a triangulation algorithm applied to the images of the separate cameras. The movement in the Z direction and the movement in two dimensions described with respect to FIG. 1 enable the system to map an image space to a 3D cursor. Thus, in addition to the cursor moving up/down and left/right in the display corresponding to the up/down and left/right movement of the remote control unit 2, a movement of the remote control unit toward or away from the cameras 24 and 26 produces a corresponding 3D rendering of the cursor movement in and out of the display.

Figure 3:
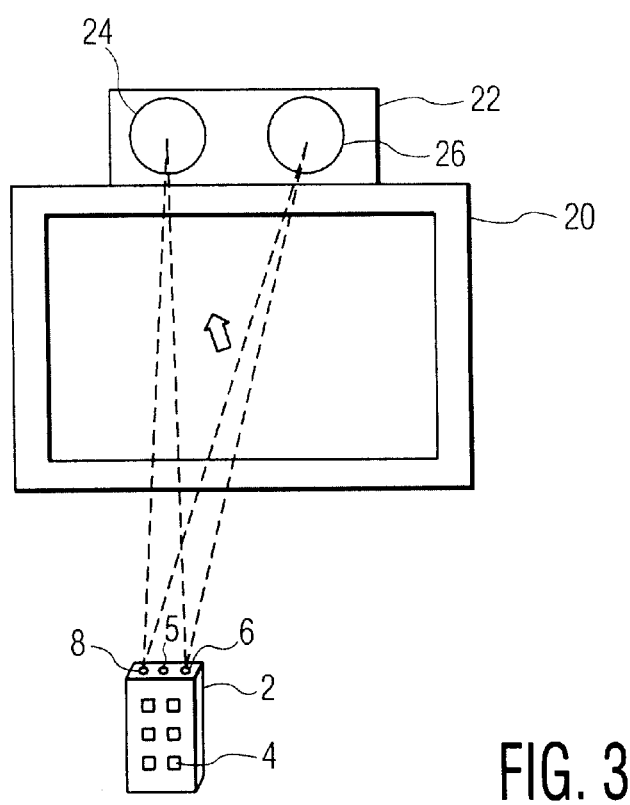
FIG. 3 is a representative view of the remote control system according to a further embodiment of the present invention; and, FIG. 4 is a flow chart illustrating the operation steps according to an embodiment of the present invention.

FIG. 3 illustrates a further system whereto the embodiment of the present invention may be applied as discussed in U.S. patent application Ser. No. 09/746,045. The construction and operation of the system shown in FIG. 3 are essentially the same as that described above with respect to FIG. 2 in the above-cited U.S. patent application Ser. No. 09/746,045. The only notable difference is that at least two LEDs 6 and 8 are added into the remote control unit 2 to enable the system to obtain all six degrees of motion—three translation and three rotational. The three translation degrees of motion are detected and mapped from the image space to the display as described with respect to FIG. 2. The rotational motion of the remote control unit 2 uses the second LED 8, such that the light emitted from both LEDs 6 and 8 is detected separately and tracked by both cameras 24 and 26. The control unit 22 analyzes the relative movement of the light spots in successive images as detected by the control unit 22 indicating a rotation (roll) of the remote control unit 2 along the axis of light emission. Other changes in the relative position of the light spots in the image, such as the distance between them, may be used by the control unit 22 to determine the pitch and yaw of the remote control unit 2.

Figure 4:
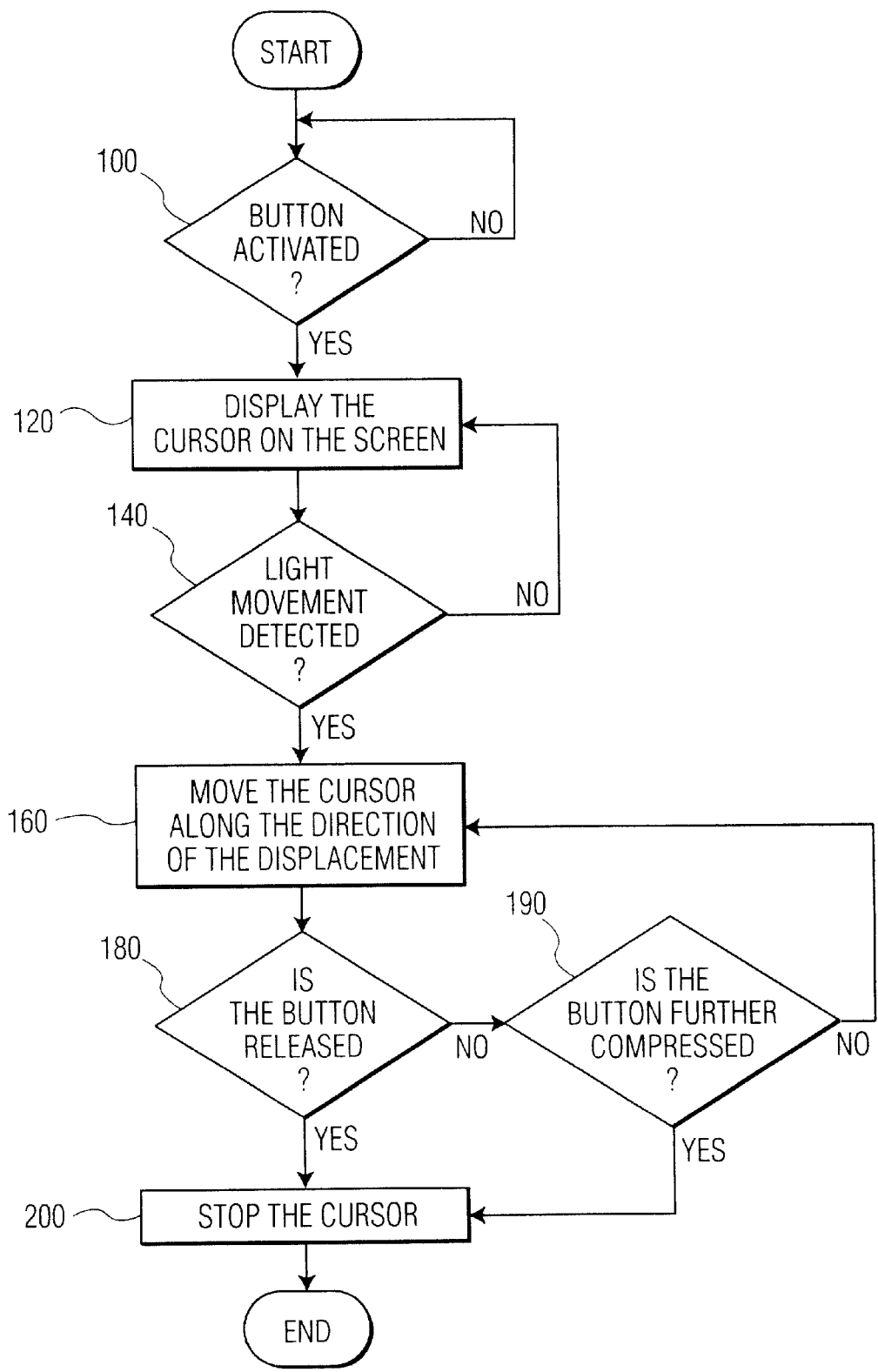

FIG. 4 illustrates the operation steps according to the embodiment of the present invention. In step 100, one of the push buttons provided in the remote control unit 2 is activated by the user to turn the LED 6 on. The light image captured by the camera 24 is transmitted to the control unit 22, which in turn maps the position and rotation of the remote control unit 2 to display the cursor on the screen of the TV set 20 in step 120. Thereafter, in step 140, any light movement is captured with the camera 24 and the captured images are transmitted to the control unit 22. The speed of cursor is proportional to the light displacement captured by the camera 24. Also, the cursor can be projected in multiple on the TV screen to reflect the varying speed of the cursor movement based on the light displacement amount. For example, additional arrows in a row may be displayed as the detected light displacement becomes longer. If no light displacement is detected, the cursor is displayed on the screen motionlessly as long as the user is pressing the button that activated the LED 6. If the light movement is detected in step 160, the control unit 22 operates to initiate the movement of the cursor in the same direction of the light movement. Visual feedback is given to the user bout this direction, i.e., a line drawn from the current cursor position in the direction that the cursor begins to travel. The movement of the cursor in the direction of the light movement continues until a command signal to stop the cursor is received from the user via the remote control unit 2 in step 180. To stop the cursor movement, the user may release the button that was activated in step 100. Alternatively, the cursor movement may be stopped when the direction of the light movement transmitted from the remote control unit 2 is changed. For example, if the user shifts the light movement in the opposite direction, the control unit 22 recognizes this movement as a request to stop the cursor.

Meanwhile, if the activated button is pressed further in step 190, the remote control unit 2 will change the IR command it is sending via the IR LED 5. This change will be noticed by the IR detector of the control unit 22 and at the same time lead to a stop command for the cursor and a selection command in step 200. That is, as the cursor is moving in the screen with computer generated presentations, the selection is made by the cursor through the full activation of the button to present the next material on the screen. Accordingly, the location of the cursor on the screen is used to select the illuminated on-screen icon or material detected therein. Alternatively, a different button may be provided to activate the selection when the cursor comes to a halt as described in step 200.

In an alternate embodiment of the present invention, the cursor movement can be related to the content on the screen. For example, if only a few selection screen buttons are shown during screen manipulation, the directions of the traveling cursor can be restricted to pass only those few buttons. That is to say, there can be "gravity wells" which attract the cursor to fall within one of those screen buttons when the cursor comes near a predefined region surrounding a particular button. Thus, it becomes easier for the user to reach one of the desired screen buttons on the display, even with an unstable hand.

As described above, the movement of the remote control unit 2 is used to move a cursor, point device, or other movable features on the display. It should be noted that more than one remote control unit may be used according to the techniques of the present invention. For example, two or more separate remote control units having flashing LEDs in the field of view of the camera 24 will have the light focused on the light sensitive array. Each flashing LED is detected separately and tracked in the image by the control unit 22 in the manner described above for a single remote control unit 2. Hence, each of the two or more remote control units 2 may control a separate cursor independently or other movable feature on the display. Here, the LEDs may emit light of different wavelengths and different pattern of flashing for discriminating users in a multiple user setting.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A system for controlling the movement of a cursor on a monitor screen, comprising:
   at least one remote control unit for remotely controlling the moving direction of said cursor on said monitor screen;
   at least one light emitting element for emitting light indicative of a signal generated by a first click operation of said remote control unit;
   a light detector for extracting a movement of the light transmitted sequentially from said remote control unit; and,
   a control unit adapted to display the moving position of said cursor on said monitor screen corresponding to the extracted movement of the light from said remote control unit and to stop the moving position of said cursor if the movement of the light transmitted from said remote control unit changes in the opposite direction.

2. The system of claim 1, wherein said light detector communicates with said control unit to deliver a sequence of digital images that include the light emitted by said remote control unit.

3. The system of claim 1, wherein said control unit comprises an image detection algorithm that detects the image of the light transmitted from said remote control unit.

4. The system of claim 1, wherein said light detector is a digital camera.

5. The system of claim 1, wherein said light emitting element is an LED.

6. The system of claim 1, wherein said remote control unit comprises a plurality of push button switches.

7. The system of claim 1, wherein said light detector comprises two digital cameras for detecting the position of said remote control unit in three dimensions.

8. The system of claim 7, wherein said remote control unit comprises two light emitting elements for detecting the rotation position of said remote control unit in three dimensions.

9. The system of claim 1, wherein the speed of said cursor is proportional to the light displacement detected by said light detector.

10. The system of claim 1, wherein said at least one light emitting element further comprises a signal generating element to activate said cursor on said monitor screen in response to said first click operation.

11. The system of claim 10, wherein said signal generating element comprises one of an infra red (IR), a visible ray, ultraviolet ray, supersonic wave, electronic wave, and a radio frequency signal.

12. A system for controlling the movement of a cursor on a monitor screen, comprising:
    two or more remote control units, each having at least one light emitting element adapted to transmit light at different frequencies;

at least one light detector for detecting the light movement transmitted from each light emitting element of said remote control units; and, a control unit for displaying said cursor on said monitor screen through a first click operation of said remote control unit and for translating the movement of said cursor based on the detected light movement from said remote control unit, wherein the motion of said cursor is halted if the movement of the light transmitted from said remote control unit changes in the opposite direction.

13. The system of claim 12, wherein said light detector communicates with said control unit to deliver a sequence of digital images that include the light emitted by said remote control units.

14. The system of claim 12, wherein said control unit comprises an image detection algorithm that detects the image of the light transmitted from said remote control units.

15. The system of claim 12, wherein said light detector is a digital camera.

16. The system of claim 12, wherein said light emitting element is an LED.

17. The system of claim 12, wherein said remote control units comprise a plurality of push button switches.

18. The system of claim 12, wherein said remote control unit comprises two light emitting elements for detecting the rotation position of said remote control unit in three dimensions.

19. The system of claim 12, wherein the speed of said cursor is proportional to the light displacement detected by said light detector.

20. The system of claim 12, wherein said at least one light emitting element further comprises a signal generating element to activate said cursor on said monitor screen in response to said first click operation.

21. The system of claim 20, wherein said signal generating element comprises one of an infra red (IR), a visible ray, ultraviolet ray, supersonic wave, electronic wave, and a radio frequency signal.

22. The system of claim 12, wherein said at least one light emitting element is further adapted to transmit a flashing light pattern.

23. A method for controlling the movement of a cursor on a monitor screen through a remote control unit having at least one light emitting element, the method comprising the steps of:

pointing said light emitting element of said remote control unit toward the monitor screen;

transmitting a first light signal indicating the beginning of the movement of said cursor through a first click operation;

detecting the movement of light generated in response to said first click operation in at least two dimensions;

moving said cursor on said monitor screen corresponding to the detected light movement from said remote control unit; and, stopping the movement of said cursor if the movement of the light transmitted from said remote control unit chances in the opposite direction.

24. The method of claim 23, further comprising the step of transmitting a second light signal through a second click operation to activate one of the selections in said monitor screen.

25. The method of claim 24, further comprising the step of activating one of said selections if said cursor comes near a predefined region surrounding one of said selections.

26. The method of claim 23, wherein the movement of said cursor is proportional to the detected light displacement from said remote control unit.

* * * * *